(12) United States Patent
Tsai et al.

(10) Patent No.: US 8,055,811 B2
(45) Date of Patent: Nov. 8, 2011

(54) COMPUTER HAVING FUNCTION FOR DISPLAYING STATUS OF OPERATION AND FLOPPY MODULE

(75) Inventors: Hsi-Jung Tsai, Hsinchu (TW);
Chi-Hung Lin, Tainan County (TW);
Shih-Hao Yeh, Taoyuan County (TW)

(73) Assignee: Nuvoton Technology Corporation, Hsinchu (TW)

( * ) Notice: Subject to any disclaimer, the term of this patent is extended or adjusted under 35 U.S.C. 154(b) by 263 days.

(21) Appl. No.: 12/564,054

(22) Filed: Sep. 22, 2009

(65) Prior Publication Data
US 2010/0246049 A1 Sep. 30, 2010

(30) Foreign Application Priority Data

Mar. 25, 2009 (TW) ................................ 98109735 A

(51) Int. Cl.
*G06F 3/00* (2006.01)
(52) U.S. Cl. .................. 710/19; 710/2; 710/15; 360/79; 360/137
(58) Field of Classification Search .................. None
See application file for complete search history.

(56) References Cited

U.S. PATENT DOCUMENTS 5,305,013 A * 4/1994 Daniels ........................... 345/82
2008/0010519 A1* 1/2008 Beyer .............................. 714/21
2008/0218892 A1* 9/2008 Haustein et al. ................ 360/69

FOREIGN PATENT DOCUMENTS

JP 2002010183 A * 1/2002

* cited by examiner

*Primary Examiner* — Eron J Sorrell
(74) *Attorney, Agent, or Firm* — Jianq Chyun IP Office

(57) ABSTRACT

A floppy module includes a floppy disk controller (FDC), a control circuit, and a display. The FDC has a first control terminal, a second control terminal, and a plurality of third control terminals. Wherein, the first control terminal and the second control terminal may respectively output a first control signal and a second control signal, and the first and second control signals having the same statuses are used for controlling a floppy disk. The display has a fourth control terminal and a plurality of data terminals respectively coupled to a portion of the third control terminals. Additionally, the control circuit may use the first control signal to replace the second control signal for controlling the floppy disk, and transmit the second control signal to the fourth control terminal such that a status information is shown on the display as the floppy disk being idle.

17 Claims, 4 Drawing Sheets

| 300 | 320 |
|---|---|
| MOA# | |
| DSA# | E (Enable Terminal) |
| DRVDEN0# | RS (Register Selection Terminal) |
| INDEX# | RW (Read/write Terminal) |
| DIR# | |
| STEP# | DB0 (Data Terminal 0) |
| WD# | DB1 (Data Terminal 1) |
| WE# | DB2 (Data Terminal 2) |
| TRAK0# | DB3 (Data Terminal 3) |
| WP# | DB4 (Data Terminal 4) |
| RDATA# | DB5 (Data Terminal 5) |
| HEAD# | DB6 (Data Terminal 6) |
| DSKCHG# | DB7 (Data Terminal 7) |

FIG. 3

COMPUTER HAVING FUNCTION FOR DISPLAYING STATUS OF OPERATION AND FLOPPY MODULE

CROSS-REFERENCE TO RELATED APPLICATION

This application claims the priority benefit of Taiwan application serial No. 98109735, filed on Mar. 25, 2009. The entirety of the above-mentioned patent application is hereby incorporated by reference herein and made a part of this specification.

BACKGROUND OF THE INVENTION

1. Field of the Invention

The present invention is related to a floppy module, and more particularly, to the floppy module for showing a status of a computer.

2. Description of Related Art

Floppy disk is an earliest movable storage medium used in a personal computer. There are 3 types of floppy disks such as 8 inch, 5.25 inch, and 3.5 inch floppy disks. Wherein, a most commonly-used floppy disk is the 3.5 inch floppy disk with a capacity of 1.44 MBytes. The floppy disks are also divided into a hard-sectored and a soft-sectored.

With development of hardware manufacturing technology, a size of the floppy disk gets smaller with the capacity increased gradually. However, since a read/write head is required to touch the floppy disk when reading data from or writing data into the floppy disk, after a multiple times of reading and writing, data on the floppy disk is easily damaged due to wear out on the floppy disk. In addition, the floppy disk is easily influenced by external environmental factors such as heat and humidity, thereby impacting upon lifetime of the floppy disk, therefore a perseverance of data is very limited. Meanwhile, the floppy disk cannot satisfy data access of large amount and high speed. To sum up reasons mentioned previously, the floppy disk is gradually discarded and replaced by optical storage media or flash memory.

Currently, on a computer, there is a trend of gradually reducing allocating the floppy drive from two to one and even not allocating the floppy drive as standard equipment. Even so, in a system of the computer, there are still reserved control signals and mechanisms for controlling the floppy disk. However, with a low usage rate of the floppy disk, these signals are also idle without addition applications and resulting in a waste.

SUMMARY OF THE INVENTION

The present invention provides a floppy module for showing a current status of a computer.

The present invention provides a computer, capable of showing a current operation situation to a user, or showing user-configured messages.

The present invention provides a floppy module, including a floppy disk controller (FDC), a control circuit, and a display. The floppy driver controller comprises a first control terminal, a second control terminal, and a plurality of third control terminals, outputting respectively a first control signal, a second control signal, and a plurality of third control signals for controlling a floppy drive. Moreover, the control circuit may be coupled to the FDC and the display, and may transmit the second control signal to the display for controlling the display to display a status information.

From another perspective, the present invention also provides a computer, including a processing system, an input output control unit, and a display. The input output control unit may be coupled to the processing system and include a control circuit for receiving a first control signal, a second control signal, and a plurality of control signals for controlling a floppy disk operation. Accordingly, the control circuit may determine a status of a display enable signal according to the first control signal, and determine whether to output the third control signals as a plurality of data signals. Further, the display includes a fourth control terminal and a plurality of data terminals, respectively coupled to the input output control unit. When the first control signal is in a first status, the control circuit may make the display enable signal to be in a third status so as to enable the display and transmits the third control signal to the data terminal of the display as the data signals so as to control the display to show the current status of the computer.

In an exemplary embodiment of the present invention, the computer also includes the aforementioned floppy drive, comprising a fifth control terminal and a sixth control terminal respectively configured as control terminals for receiving the first control signal and the second control signal, and the statuses of the first control signal and the second control signal are approximately identical during an operation period, Moreover, the fifth control terminal and the sixth control terminal may be coupled to the control circuit. Accordingly, the control circuit may transmit the first control signal to the fifth control terminal and the sixth control terminal to replace the second control signal for controlling the floppy drive. Therefore, the second control signal may be transmitted to the fourth control terminal so as to activate the display to show the status information when the first control signal is in the first status.

In addition, the control circuit described above may include an arbitrator, an enabler, and a selector. The arbitrator includes an input terminal which may be coupled to the first control terminal for receiving the first control signal. Output terminals of the arbitrator may be respectively coupled to the fifth control terminal and the sixth control terminal, and may be coupled to an enable terminal of the enabler and a selection terminal of the selector. Wherein, a status of the output terminals of the arbitrator may be changed according to the status of the first control signal. When the first control signal is in a second status, the status of the output terminals may be in a fourth status such that the floppy drive is in an enabled status. Besides, an input terminal of the enabler may receive the second control signal, and an output terminal of the enabler may be coupled to the fourth terminal. Accordingly, when the first control signal is in the first status, the enabler may transmit the second control signal to the fourth control terminal as the display enable signal so as to activate a display operation. Further, the selector also includes a plurality of selection input terminals and a plurality of selection output terminals, wherein each of the selection input terminal is respectively and correspondingly coupled to one of the third control terminals, and the selection output terminal is coupled to the floppy drive and the data terminal of the display. When the first control signal is in the first status, the selection would selects to transmit signals output by the third control terminals to the data terminal of the display. On the contrary, when the first control signal is in the second status, the selector may output the signals output by the third control terminals to the floppy drive.

In addition, the aforementioned first control signal may be a motor disk A on (MOA#) signal, and the second control signal may be disk selection control signal (DSA#).

The display may be disposed in the floppy module in the present invention, and the second control signal may be used to control the operation of the display. Therefore, the present invention may use the floppy module to show the current status of the computer.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates a specification table of using a floppy drive controller to output control signals for controlling a display according to a preferred embodiment of the present invention.

DESCRIPTION OF EMBODIMENTS

Figure 1:
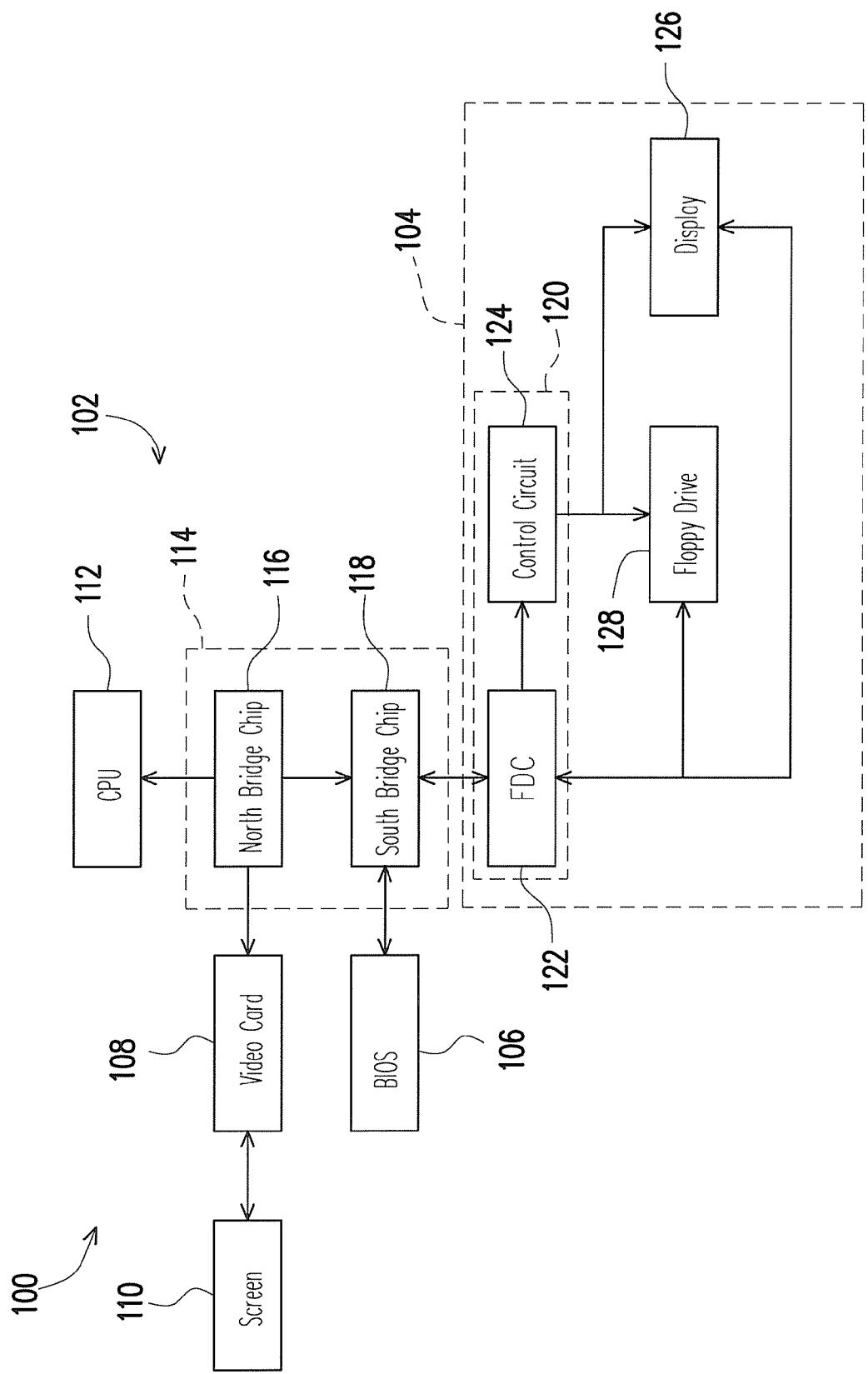
FIG. 1 is a system block diagram illustrating a computer according to a preferred embodiment of the present invention.

FIG. 1 is a system block diagram illustrating a computer according to a preferred embodiment of the present invention. Referring to FIG. 1, a computer 100 provided by the present embodiment includes a processing system 102 and a floppy module 104. Besides, it is well known that there may be other hardware modules in the computer 100 such as a basic input output system (BIOS) unit 106, a video card 108, and so on, and these hardware modules mostly may be coupled to the processing unit 102. Wherein, the video card 108 may drive a screen 110 for displaying images.

The processing system 102 includes a CPU 112 and a chipset 114. The CPU 112 may be coupled to the chipset 114, and the chipset 114 may be coupled to the hardware modules such as the floppy module 104, the video card 108, and so on.

Generally speaking, the chipset 114 may also include a north bridge chip 116 and a south bridge chip 118, but the present invention is not limited thereto. In the present embodiment, the north bridge chip 116 may be coupled to the CPU 112 and may also be coupled to the hardware modules such as the video card 108, and so on. In addition, the south bridge chip 118 may be coupled to the north bridge chip 116, and may also be coupled to the floppy module 104 and the BIOS unit 106. In the present embodiment, the south bridge chip 118 may be coupled to the floppy module 104 through a low pin count (LPC) bus.

The CPU 112 is a center of the computer 100, when commands are issued, the commands may be first received by the north bridge chip 116 to control related hardware, or further transmitted to the south bridge chip 118. Similarly, the south bridge chip 118 may also, according to the commands transmitted by the north bridge chip 116, control the related hardware modules such as controlling the floppy module 104.

Referring to FIG. 1, the floppy module 104 at least includes an input output control unit (e.g., a Super IO chip, abbreviated as a SIO chip) 120 and a display 126. The input output control unit (hereinafter referred to be SIO) 120 may be coupled to the processing system 102, and may also be coupled to the display 126. Wherein, the display 120 may be a liquid crystal display device. In some other selective embodiments, there may also be a floppy drive 128 allocated in the floppy module 104, and the floppy drive 128 may also be coupled to the SIO 120.

FIG. 3 illustrates a specification table of using a floppy drive controller to output control signals for controlling a display according to a preferred embodiment of the present invention. Referring to both FIG. 1 and FIG. 3, the field 300 shows control signals output by a floppy drive controller 122. Wherein, control signal MOA# (i.e., a motor disk A on) may be output from the first control terminal of the floppy drive controller 122, and hereinafter defined as a first control signal. Moreover, control signal DSA# (i.e., a disk selection control signal) may be output from the second control terminal of the floppy disk controller 122, and defined as a second control signal. Especially, the control signals MOA# and DSA# are approximately identical during an operation period. Applications of the first control signal MOA# and the second control signal DSA# will be described in details in the following.

In addition, the floppy drive controller 122 may respectively output a plurality of control signals DRVDEN0, INDEX#, DIR#, STEP#, WD#, WE#, TRAK0#, WP#, RDATA#, HEAD#, and DSKCHG#, and may be defined as third control signals. These third control signals are configured to control operations of the floppy drive 128 in original configurations.

Figure 2:
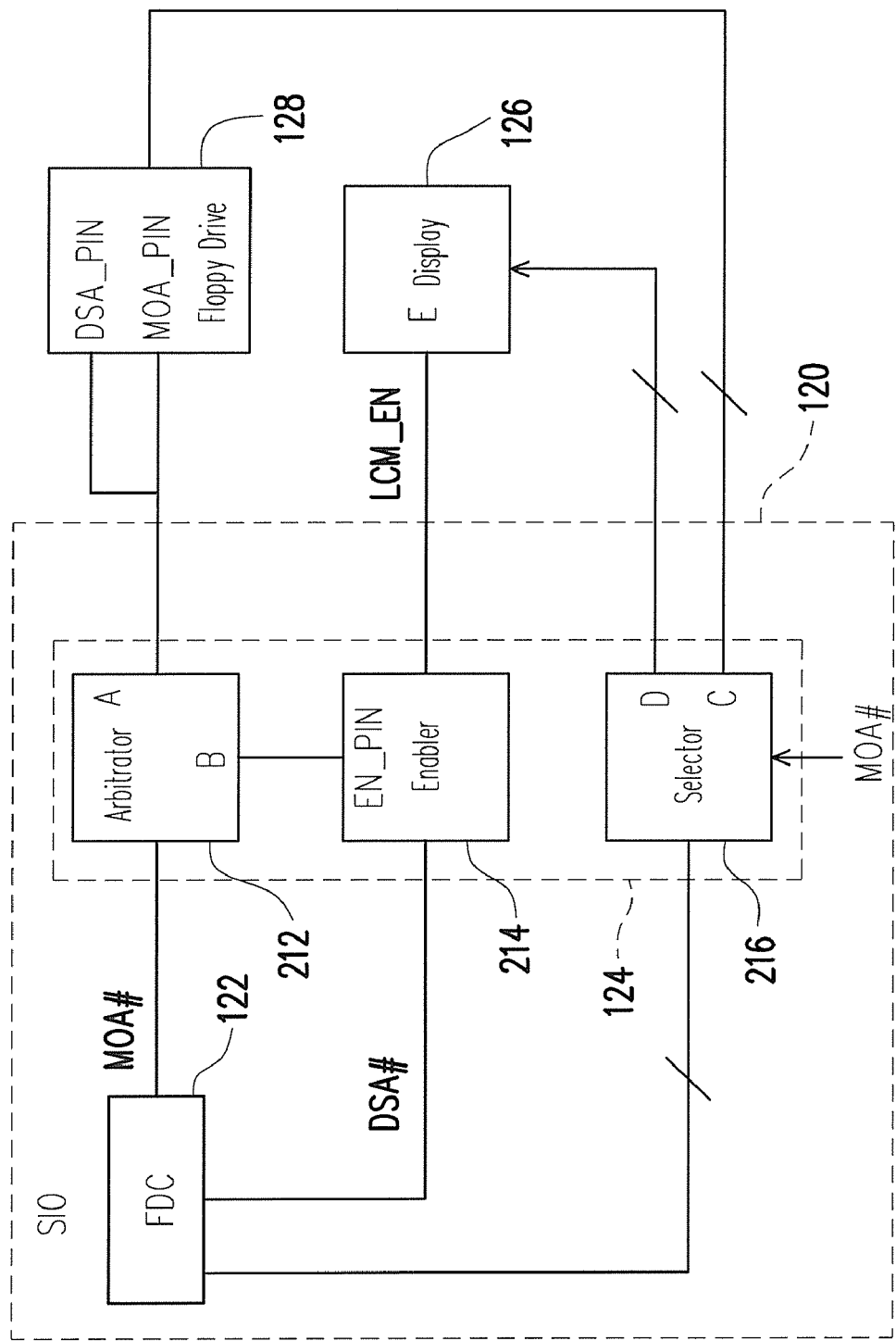
FIG. 2 is an electric circuit block diagram illustrating a control circuit according to a preferred embodiment of the present invention.

FIG. 2 is an electric circuit block diagram illustrating a control circuit according to a preferred embodiment of the present invention. Referring to both FIG. 1 and FIG. 2, the input output control unit 120 may include the floppy drive controller (FDC) 122 and a control circuit 124. The FDC 122 may be coupled to the chipset 114 and the control circuit, and the control circuit may be coupled to the floppy drive 128 and the display 126. Wherein, the FDC 122 includes a first control terminal, a second control terminal, and a plurality of third control terminals for outputting a plurality of control signals for controlling the floppy drive 128.

The control circuit 124 includes an arbitrator 212, an enabler 214, and a selector 216. An input terminal of the arbitrator 212 may be coupled to the first control terminal of the FDC 122 for receiving the first control signal MOA#. Besides, an arbitration output terminal A of the arbitrator 212 may be coupled to the fifth control terminal MOA_PIN and the sixth control terminal DSA_PIN. In an original design, the fifth control terminal MOA_PIN and the sixth control terminal DSA_PIN of the floppy drive 128 are respectively configured to receive the first control signal MOA# and the second control signal DSA#. In addition, an output terminal B of the arbitrator may be coupled to the enabler 214. An arbitration output terminal B may be coupled to an enable terminal EN_PIN of the enabler 214.

Moreover, an input terminal of the enabler 214 may be coupled to the second control terminal of the FDC 122, and an output terminal of the enabler 214 may be coupled to an enable terminal E (hereinafter referred to as a fourth control terminal E) of the display 126. As shown in a column 320 of FIG. 3, the display 126 also includes a register selection terminal RS, a read/write terminal RW, and a plurality of data terminals such as DB[0:7], which may be coupled to the selector 216.

In the present embodiment, the selector 216 includes a plurality of input terminals, a selection terminal, a plurality of first selection output terminal C, and a second selection output terminal D. Wherein, the input terminals and the selection terminals of the selector 216 may be coupled to the third control terminal and the first control terminal of the FDC 122 for receiving the third control signals DRVDEN0, INDEX#, DIR#, STEP#, WD#, WE#, TRAK0#, WP#, RDATA#, HEAD#, DSKCHG#, and the first control signal MOA#. In addition, the first selection output terminal C of the selector 216 may be coupled to the floppy drive 128, and the second selection output terminal of the selector 216 may be coupled to the register selection terminal RS, the read/write terminal RW, and the data terminals DB[0:7] of the display 126.

Referring to FIG. 2, statuses of the arbitration output terminal A and the arbitration output terminal B of the arbitrator 212 may be changed according to the first control signal MOA#. The control signal MOA# and the control signal DSA# are approximately identical during an operation period. Therefore, in the present embodiment, the arbitration output terminal A may be coupled to the fifth control terminal MOA_PIN and the sixth control terminal DSA_PIN. Accordingly, the arbitrator 212 may use the first control signal MOA# to replace the second control signal DSA# for controlling the floppy drive 128, and the second control signal DSA# is changed to control an operation of the display 126.

Figure 4:
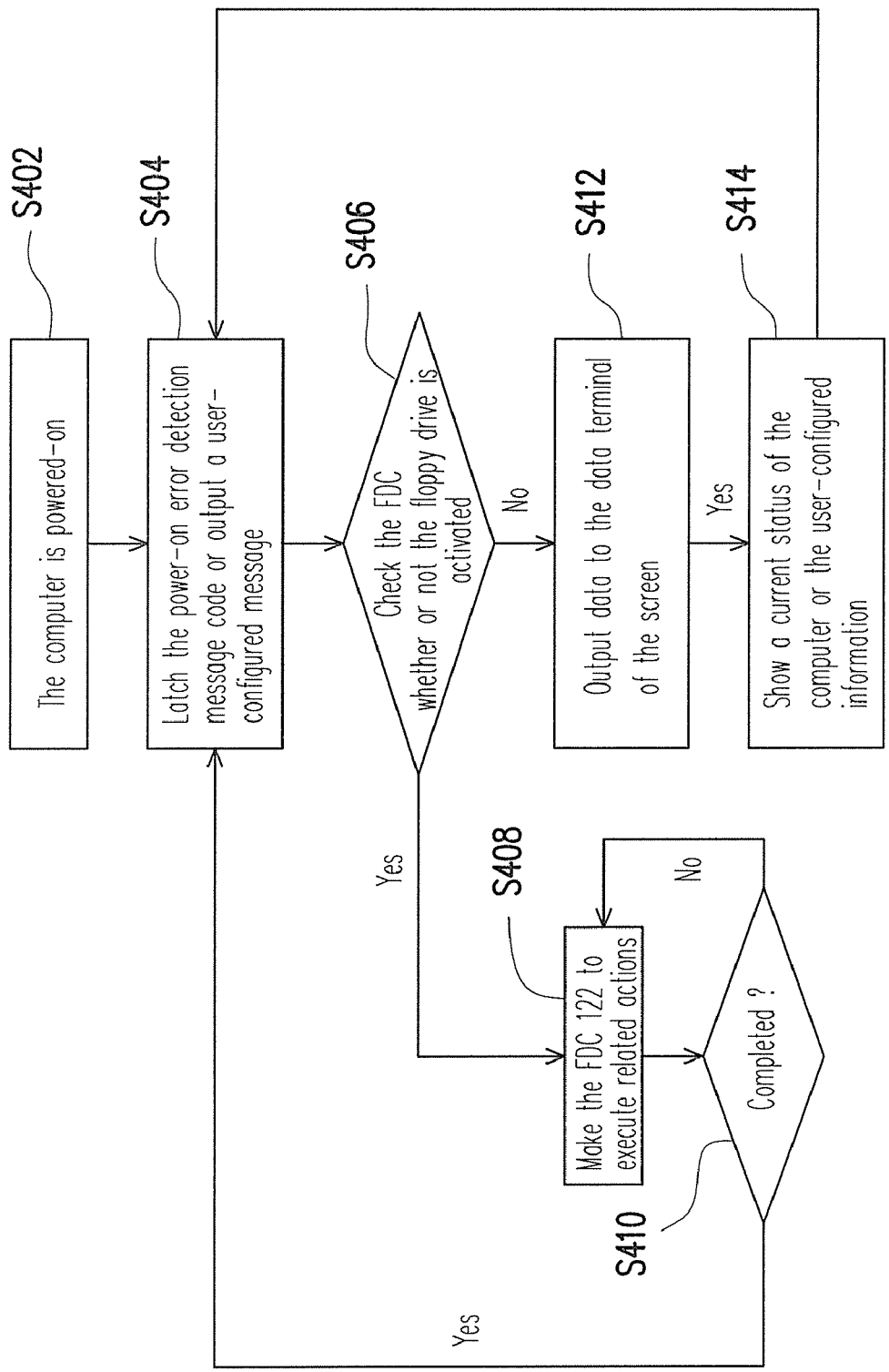
FIG. 4 is a flow diagram of an operation of a floppy module according to a preferred embodiment of the present invention.

FIG. 4 is a flow diagram of an operation of a floppy module according to a preferred embodiment of the present invention. Referring to FIG. 1, FIG. 2, and FIG. 4, when the computer 100 of the present embodiment is powered-on as in a step S402, the BIOS unit 106 performs a power-on process, and the power-on process includes a power-on self test. If there is a system error detected during the power-on self test, then the BIOS unit 106 generates a power-on error decoded port 0x80h message. The power-on error decoded port 0x80h message may be first latched as described in a step S404. In some other embodiments, if there is no any of the system error during an execution of the power-on process, then in the step S404, a user-configured message may be output.

Next, in a step S406, the FDC 122 is checked whether or not to activate the floppy drive 128 in the present invention. The step S406 seen from another perspective, when the first control signal MOA# is in a second status (e.g., a low status), the arbitration output terminal A and the arbitration output terminal B may be respectively the fourth status (e.g., the low status). Then, the fifth control terminal MOA_PIN and the sixth control terminal DSA_PIN of the floppy drive 128 are also in the low status such that the floppy drive is enabled.

If, in the step S406, the FDC 122 is detected to activate the floppy drive 128 (i.e., a path labeled with "Yes" in the step S406) in the present invention, the selector 216, due to transmitting the first control signal MOA# of the selection terminal, transmits the third control signals DRVDEN0, INDEX#, DIR#, STEP#, WD#, WE#, TRAK0#, WP#, RDATA#, HEAD#, and DSKCHG# from the first selection output terminal C to the floppy drive 128 as described in a step S408, thereby making the FDC 122 to execute related actions. Next, as described in a step S410, whether actions of the FDC 122 are completed is checked in the present invention. If actions of the FDC 122 are executed completely (i.e., a path labeled as "Yes" in the step S410), then returns back to the step S404.

On the contrary, if in the step S406, the FDC 122 outputs the first control signal MOA# having a first status (e.g., a high status), the statuses of the arbitration output terminal A and the arbitration output terminal B would be switched to a third status (e.g., a high status). Then, the floppy drive 120 would be made in an idle state due to the fifth control terminal MOA_PIN and the sixth control terminal DSA_PIN being in the high status (i.e., a path labeled with "No" in the step S406).

On the other hand, when a status of the second arbitration output terminal B of the arbitrator 212 is in the third status, the enabler 214 would be enabled due to a status of the enable terminal EN_PIN being in the third status. Then, the second control signal DSA# may be transmitted to the fourth control terminal E of display 126 as a display enable signal LCM_EN by the enabler 214. Then, due to the first control signal MOA# being in the first status, the second control signal DSA# may also be in the first status, resulting in the display 126 being enabled.

On the other hand, when the first control signal MOA# is in the first status, the selector 216, due to the selection terminal being in the first status, selects the received third control signals DRVDEN0, INDEX#, DIR#, STEP#, WD#, WE#, TRAK0#, WP#, RDATA#, HEAD#, and DSKCHG# from the second selection output terminal D to the display 216. As illustrated in FIG. 3, a portion of the third control signals, such as STEP#, WD#, WE#, TRAK0#, WP#, RDATA#, HEAD#, and DSKCHG# may be transmitted to the data terminals DB[0:7] as data signals (in a step S412). The rest of the third control signals, such as the third control signals DRVDEN0 and INDEX# may be respectively transmitted to the register selection terminal RS and the read/write terminal RW as a register selection signal and a read/write signal. Accordingly, the display 126 may show a current status of the computer 100 as illustrated in FIG. 4. For example, a power-on error detection message would be transmitted to the display 126 and shown to the user. In addition, the display 126 may also show information of the CPU 112 such as temperature and a fan speed. In some other embodiments, the display 126 may also show the user-configured message as illustrated in the step S404.

In summary, the present invention may add a function of showing the computer status by using original control signals of the floppy module. Therefore, added value of the computer may be increased without increasing system complexity in the present invention.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A floppy module, comprising:
    a floppy driver controller, having a first control terminal, a second control terminal, and a plurality of third control terminals for outputting a first control signal, a second control signal, and a plurality of third control signals for controlling a floppy drive;
    a display, having a fourth control terminal and a plurality of data terminals coupled to at least a portion of the third control terminals; and
    a control circuit, coupled to the floppy drive controller and the display, transmitting the second control signal to the fourth control terminal for controlling the display to show a status information.

2. The floppy module as claimed in claim 1 further comprises the floppy drive, comprising a fifth control terminal and a sixth control terminal respectively configured as control terminals for receiving the first control signal and the second control signal, and statuses of the first control signal and the second control signal are substantially the same during an operation period,
    wherein the fifth control terminal and the sixth terminal are coupled to the control circuit sending the first control signal to the fifth control terminal and the sixth control terminal for replacing the second control signal for controlling the floppy disk so as to transmit the second control signal to the fourth control terminal for activating the display to show the status information when the first control signal is in a first status.

3. The floppy module as claimed in claim 2, wherein the control circuit comprises:
an arbitrator, having an input terminal coupled to the first control terminal for receiving the first control signal, a first arbitration output terminal coupled to the fifth control terminal and the sixth control terminal respectively and a second arbitration output terminal, and the statuses of the first arbitration output terminal and the second arbitration output terminal are changed according to the status of the first control signal, and when the first control signal is in a second status, the statuses of the first arbitration output terminal and the second arbitration output terminal of the arbitrator is in a fourth status such that the floppy drive is in an enabled status;
an enabler, having an enable terminal coupled to the second arbitration output terminal of the arbitrator, an input terminal coupled to the second control terminal and an output terminal coupled to the fourth control terminal so as to transmit the second control signal to the fourth control terminal for activating the display to show the status information when the first control signal is in the first status; and
a selector, having a selection terminal, a plurality of selection input terminal, a plurality of first selection output terminals, and a plurality of second selection output terminals, wherein each of the selection input terminals is respectively coupled to one of the third control terminals, the first selection output terminals and the second selection output terminals are respectively coupled to the floppy drive and the data terminals of the display, and the selection terminal is coupled to the first control terminal so as to determine to output signals output by the third control terminals from the first selection output terminals or the second selection output terminals according to the first control signal,
wherein when the first control signal is in the first status, the first arbitration output terminal and the second arbitration output terminal are in a third status so as to make the floppy drive in an idle status such that the selector selects to output the signal output from the third control terminals to the data terminals of the display, and
when the first control signal is in the second status, the selector outputs the signal output by the third control terminals to the data terminals of the floppy drive.

4. The floppy module as claimed in claim 3, wherein a voltage level of the first control signal when the first control signal is in the first status is higher than the voltage level of the first control signal when the first control signal is in the second status.

5. The floppy module as claimed in claim 1, wherein the first control signal is a motor disk A on control signal.

6. The floppy module as claimed in claim 1, wherein the first control signal is a disk selection control signal.

7. A computer, comprising:
a processing system;
an input output control unit, coupled to the processing system, comprising a control circuit for receiving a first control signal used to control an operation of a floppy drive, a second control signal, and a plurality of third control signal, and determining a status of a display enable signal and whether or not outputting the third control signals as a plurality of data signals according to a status of the first control signal; and
a display, having a fourth control terminal and a plurality of data terminals coupled to the input output control unit,
wherein when the first control signal is in a first status, the control circuit makes the display enable signal to be in a third status so as to enable the display, and the control circuit further transmits the third control signal to the data terminals as the data signals so as to control the display to show a current status of the computer.

8. The computer as claimed in claim 7 further comprising the floppy drive, comprising a fifth control terminal and a sixth control terminal respectively configured as control terminals for receiving the first control signal and the second control signal, and statuses of the first control signal and the second control signal are substantially the same during an operation period,
wherein the fifth control terminal and the sixth control terminal are coupled to the control circuit sending the first control signal to the fifth control terminal and the sixth control terminal so as to replace the second control signal for controlling the floppy drive.

9. The computer as claimed in claim 8, wherein the control circuit comprises:
an arbitrator, having an input terminal coupled to the first control terminal for receiving the first control signal, a first arbitration output terminal coupled to the fifth control terminal and the sixth control terminal respectively, and a second arbitration output terminal, and the statuses of the first arbitration output terminal and the second arbitration output terminal are changed according to the status of the first control signal, when the first control signal is in a second status, the statuses of the first arbitration output terminal and the second arbitration output terminal of the arbitrator is in a fourth status such that the floppy drive is in an enabled status;
an enabler, having an enable terminal, coupled to the second arbitration output terminal of the arbitrator, an input tell final coupled to the second control terminal, and an output terminal coupled to the fourth control terminal so as to transmit the second control signal to the fourth control tell final for activating the display to show the status information when the first control signal is in the first status; and
a selector, having a selection terminal, a plurality of selection input terminal, a plurality of first selection output terminals, and a plurality of second selection output terminals, wherein each of the selection input terminals is respectively coupled to one of the third control terminals, the first selection output terminals and the second selection output terminals are respectively coupled to the floppy drive and the data terminals of the display, and the selection terminal is coupled to the first control terminal so as to determine to output signals output by the third control terminals from the first selection output terminals or the second selection output terminals according to the first control signal,
wherein when the first control signal is in the first status, the first arbitration output terminal and the second arbitration output terminal are in a third status so as to make the floppy drive in an idle status such that the selector selects to output the signal output from the third control terminals to the data terminals of the display, and
when the first control signal is in the second status, the selector outputs the signal output by the third control terminals to the data terminals of the floppy drive.

10. The floppy module as claimed in claim 9, wherein a voltage level of the first control signal when the first control signal is in the first status is higher than the voltage level of the first control signal when the first control signal is in the second status.

11. The computer as claimed in claim 7, wherein the first control signal is a motor disk A on control signal.

12. The computer as claimed in claim 7, wherein the first control signal is a disk selection control signal.

13. The computer as claimed in claim 7, wherein the processing system comprises:
   a CPU;
   a chipset, coupled to the CPU and the input output control unit through a data transmission medium for controlling the input output control unit to determine a status of the first control signal according to a command issued by the CPU.

14. The computer as claimed in claim 13, wherein the chipset comprises:
   a north bridge chip, coupled to the CPU for receiving the command issued; and
   a south bridge chip, coupled to the north bridge chip and the input output control unit for receiving the command issued by the CPU from the north bridge chip and controlling an output of the input output control unit.

15. The computer as claimed in claim 13, wherein the data transmission interface is a low pin count control bus.

16. The computer as claimed in claim 7, further comprising:
   a video card, coupled to the processing system, outputting a video signal; and
   a screen, coupled to the video card for displaying video according to the video signal.

17. The computer as claimed in claim 7 further comprising a basic input output unit, coupled to the processing system and embedded with a basic input output system, so as to be executed when the computer is powered-on.

* * * * *